United States Patent [19]

Volk, Jr.

[11] Patent Number: 4,726,802

[45] Date of Patent: Feb. 23, 1988

[54] MAILING COVER WITH REPLY ENVELOPE AND RESPONSE DEVICE FROM INTEGRAL WEB

[75] Inventor: Kurt E. Volk, Jr., Westport, Conn.

[73] Assignee: Kurt H. Volk, Inc., Milford, Conn.

[21] Appl. No.: 910,027

[22] Filed: Sep. 22, 1986

Related U.S. Application Data

[60] Division of Ser. No. 736,978, May 22, 1985, which is a continuation of Ser. No. 502,345, Jun. 10, 1983, abandoned, which is a continuation-in-part of Ser. No. 366,190, Apr. 7, 1982, abandoned.

[51] Int. Cl.⁴ .............................................. F16H 55/36

[52] U.S. Cl. .................................... 493/188; 493/222; 493/224; 493/231; 493/245; 493/325; 493/919

[58] Field of Search ............... 493/187, 216, 222, 231, 493/228, 233, 244, 245, 264, 325, 335, 917–921, 188, 224; 229/72, 92, 92.8

[56] References Cited

U.S. PATENT DOCUMENTS

| | | | |
|---|---|---|---|
| 3,167,243 | 1/1965 | Wileg | 229/73 |
| 3,460,744 | 8/1969 | Turkenkopf | 229/72 |
| 3,784,185 | 1/1974 | Katz | 229/72 |
| 3,820,447 | 6/1974 | Gendron et al. | 493/222 |
| 4,317,538 | 3/1982 | Alter et al. | 229/72 |

*Primary Examiner*—Frederick R. Schmidt
*Assistant Examiner*—Robert Showalter
*Attorney, Agent, or Firm*—Thomas E. Spath

[57] ABSTRACT

A composite mailing wrapper suitable for use with a catalog or magazine is produced from an integral web and comprises front and rear cover sheets joined along a longitudinal fold line to which is detachably connected at least one preformed reply envelope, and optionally, at least one response device which is detachably connected to the envelope flap(s). When assembled to the catalog the envelope(s) and optional response device(s) are contained within the fold of the cover sheets. All of the elements comprising the composite wrapper can be personalized without risk of mismatching as they are produced from an integral web and are not detached from each other during manufacture.

20 Claims, 11 Drawing Figures

MAILING COVER WITH REPLY ENVELOPE AND RESPONSE DEVICE FROM INTEGRAL WEB

CROSS-REFERENCE TO RELATED APPLICATIONS

This is a divisional of co-pending application Ser. No. 736,978, filed on May 22, 1985, which in turn is a continuation of application Ser. No. 502,345 filed June 10, 1983, now abandoned, which in turn is a continuation-in-part of application Ser. No. 366,190, filed Apr. 7, 1982, now abandoned.

BACKGROUND OF THE INVENTION

1. Field Of The Invention

This invention relates to mailing wrappers or covers for magazines and especially for mail order catalogs.

2. Description Of The Prior Art

Mail order catalogs, magazines and publications of a similar format distributed in volume are commonly mailed in wrappers intended to protect the cover and/or integrity of the catalog. Pre-printed address labels can be applied to the wrappers, or the recipient's address can be printed directly on the wrapper using any of a variety of conventional addressing machines.

Mail order catalogs are provided with an order form and may include a pre-addressed return envelope. These are commonly inserted loose in the catalog if a sealed wrapper is employed for mailing. Alternatively, the order form can be stitched, or stapled, usually in the centerfold, to become an integral part of the catalog.

While advertisers find it desirable to personalize their solicitations with the name, address, and other pertinent information relating to the recipient, it has not been practical or economical to do so where an address label is applied to a publication containing the personalized message or solicitation. Problems of mismatching of separate address labels and personalized form letters in the preparation of large volume mailings have made it impractical to use personalized pieces with catalog and magazine mailings.

It is therefore a purpose of this invention to provide a composite wrapper for a catalog, magazine or the like, which wrapper contains fields for printed material, such as an order form, and one or more preformed reply envelopes intended for use by the recipient.

It is another object of this invention to provide a wrapper which can be stitched or otherwise affixed to the outside of a completed catalog, and which will not render the catalog bulky or difficult to read.

It is a further object to provide a wrapper which comprises at least two preformed reply envelopes and at least one preprinted response device joined to the envelope.

Another object of the invention is to provide a method for preparing a composite wrapper, the elements of which comprise preprinted front and rear cover sheets joined along a longitudinal centerfold line, at least one preformed reply envelope, and optionally, one or more response devices joined to the envelope flap(s), all of which are formed from an integral sheet or web, so that two or more of the elements can be personalized without the possibility of mismatching of personal data on the elements.

SUMMARY OF THE INVENTION

The present invention relates to a composite mailing wrapper or cover suitable for use with a magazine or catalog comprising the elements of a pair of cover sheets joined along a longitudinal fold line and at least one envelope, and, optionally, one or more response devices, all of which are prepared from an integral web. In a preferred embodiment the cover sheets, envelopes and response devices are preprinted with fields of information while in the form of the integral sheet or continuous web, and thereafter passed through computer directed printing apparatus for personalization of the various elements.

The terms "personalized" and "personalization" will be understood by those familiar with the art and include the printing at predetermined positions within the fields of information such as the recipient's name, address, account number and other data that may be collected in demographic studies. These specific printing techniques are well-known in the art and do not constitute a part of the invention.

The articles of the present invention and their methods of preparation permit the personalization of two or more of the elements, i.e., cover sheets, envelopes and optional response devices, and their assembly to a magazine or catalog with the elimination of any substantial risk of mismatching.

This result is achieved by the novel method which includes the preparation of the cover sheets and envelopes, and optionally, the response devices, from an integral sheet in a manner such that the elements in the final composite article remain detachably connected by means of lines of perforations and/or staples or the like, throughout the entire manufacturing process, and are so connected when assembled to the catalog.

The elimination of mismatching of the various personalized elements permits the efficient and reliable production of the articles on high-speed equipment, with the concomitant savings associated with fewer quality control checks, reassembly of mismatched elements and wasted materials. The use of personalized enclosures such as envelopes and response devices not only expedites handling by the recipient, but permits the sender to incorporate data such as an account or order number in machine readable form so that information received in reply can be machine sorted or promptly entered into a computer data base.

The methods of the invention can readily be adapted to producing the desired articles in a wide variety of configurations, formats and sizes, all of which are within the capabilities of commercial presses, computer directed printers, and the folding and converting equipment which is available to the art.

BRIEF DESCRIPTIONS OF THE DRAWINGS

In the drawings accompanying and forming part of this specification wherein like numerals are used to refer to corresponding elements in the various figures.

DESCRIPTION OF THE PREFERRED EMBODIMENTS

Figure 1:
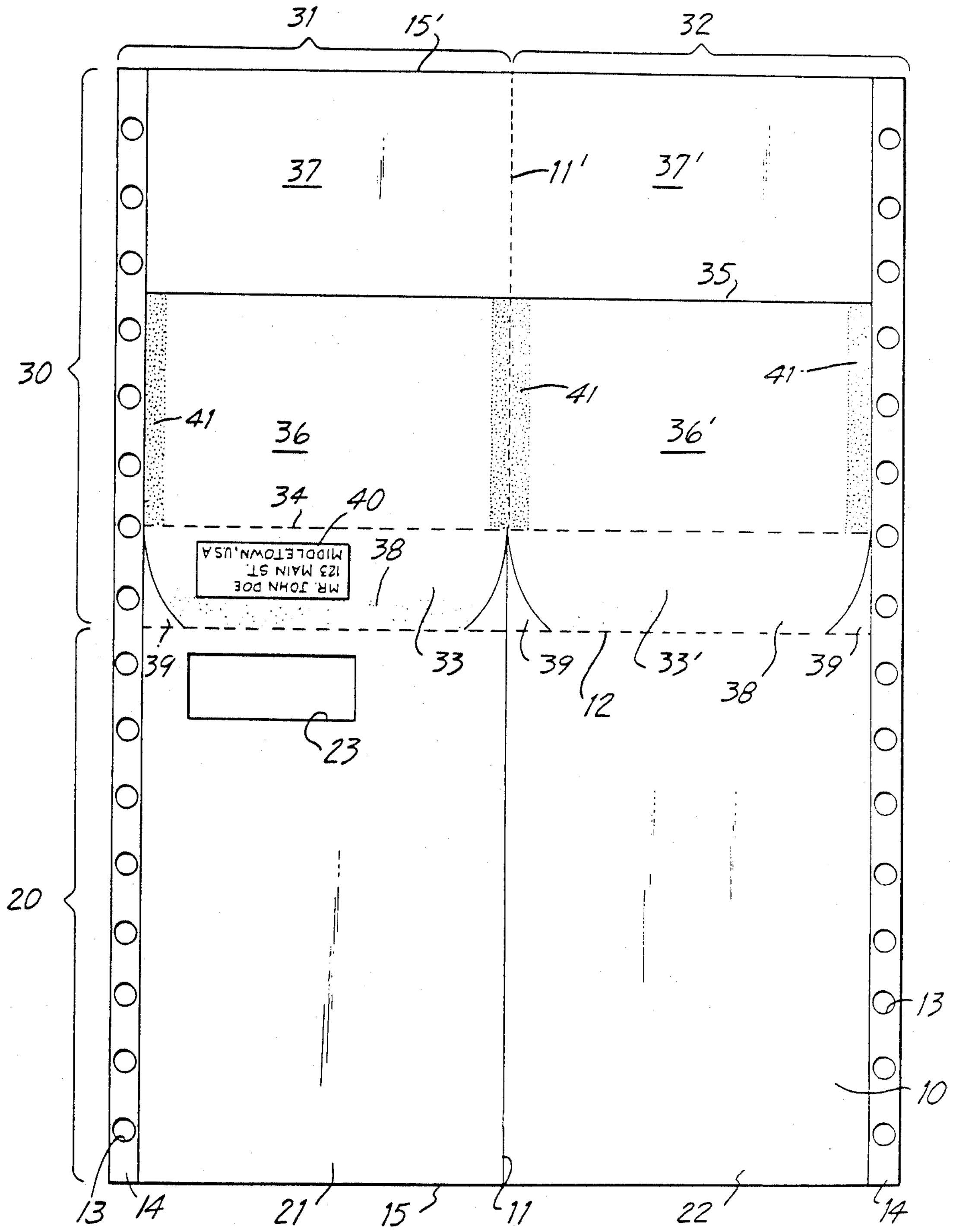
FIG. 1 is a plan view of an integral sheet, or portion of a continuous web, containing the composite cover sheet and two envelopes.

There is shown in FIG. 1 a composite sheet, or portion of a continuous web of paper, 10, which is bisected by longitudinal fold line 11. Sheet 10 is divided into cover panel 20 and envelope portion 30 by a first transverse line 12. Envelope portion 30 contains a pair of adjacent envelope blanks 31 and 32 lying on either side of line 11. Each envelope blank consists of a flap 33, defined by second transverse line 34 and a third transverse line 35 defining front envelope panel 36 and rear envelope panel 37. Flaps 33 can be coated with remoistenable gum adhesive 38. Flaps 33 can also be provided with die-cuts 39 at their respective corners.

In practising the invention in the preferred embodiment where the return envelope and cover sheet portions are to be personalized, the web 10 can be provided with line holes 13 which are positioned in outer longitudinal strips 14. Line holes facilitate indexing of preprinted sheets and webs during the personalization step where the line holes are engaged by the computer directed printer. Where sheet 10 comprises a section of a continuous printed web, the line holes facilitate the bursting of the composite forms along intermediate line 15. Strips 14 are trimmed off during a subsequent finishing step, as described below.

Figure 2:
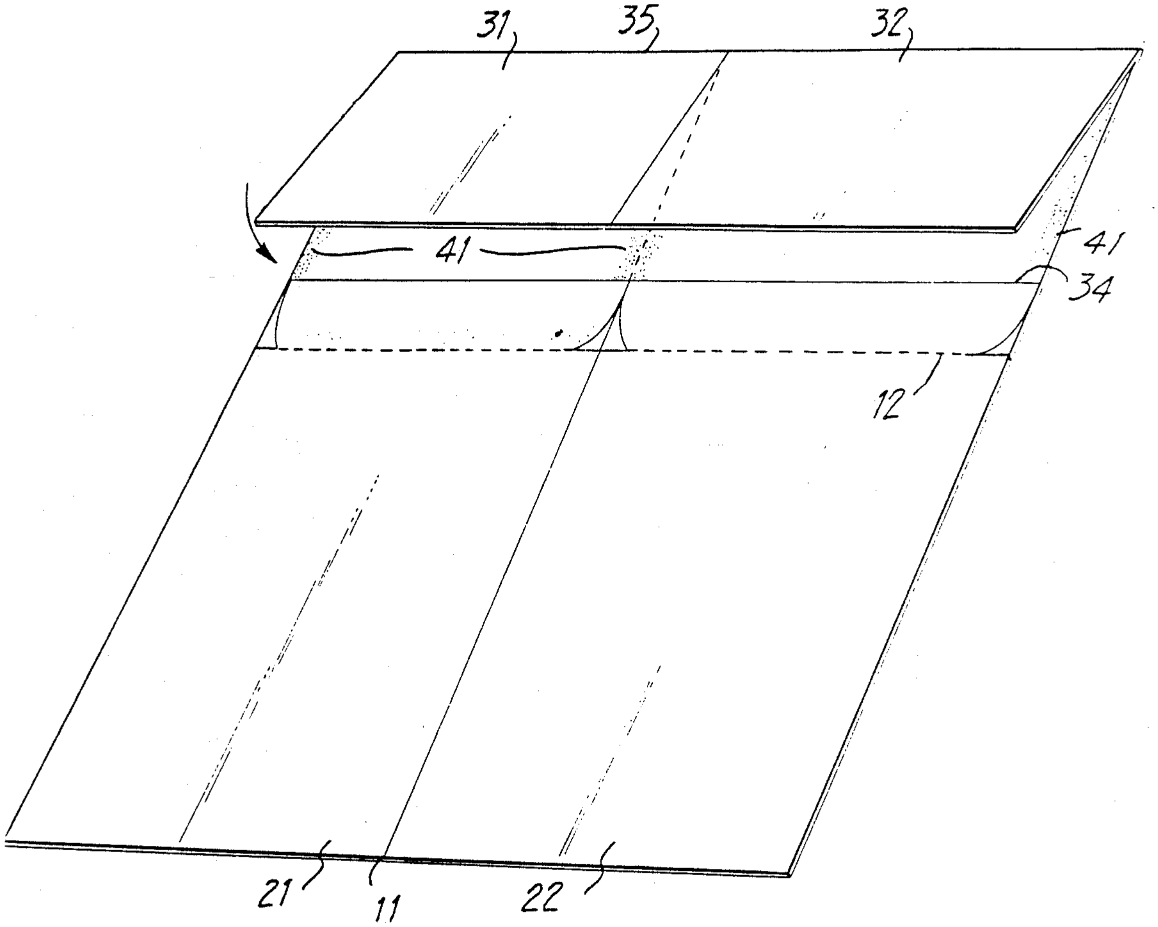
FIG. 2 is a perspective view of the embodiment of FIG. 1 showing the first folding step as partially completed.

In practising the invention, blank web 10 is fed into a form printer capable of printing an appropriate field on the adjacent cover sheets 21 and 22. Where the article is to be used as a mailing wrapper or cover for a mail-order catalog, the printed fields can include a solicitation and an order form, or simply two order forms. The form printer also prints the return address on the business reply envelope at a position obverse of front panel 36. In this illustrative description which follows it will be assumed that the article of FIGS. 1 and 2 is to be folded so that the cover page shown will be the inside facing pages, and will be assembled to the front and rear pages of the catalog. In this configuration, envelope panels 36 and 37 will likewise be folded to face each other, and remoistenable adhesive 38 will be applied to the upper surface of the web 10 as shown. Die cutting at flap corners 39 and perforations, for example, along lines 11 and 12, can be accomplished on the form printer.

The continuous web exiting the form printer is indexed and fed into the computer directed printers for personalization in any desired configuration. For example, the solicitations and order forms on the inside cover sheets 21 and 22 can be personalized in the salutation and an account number can be entered. In addition, the inside of the flap can be personalized with the name and address of the recipient. In a further preferred embodiment, which will be described in more detail below, the cover sheet 21 is provided with an opening, or window 23, as by die-cutting, which corresponds to a personalized printed field 40 on the envelope flap so that when the article is folded in the final assembly the printed field 40 on the flap 33 is visible through the window 23 in the cover sheet.

Following personalization, the web 10 is directed to appropriate folding apparatus where hot melt adhesive 41 is applied adjacent the outer edges of the pair of front envelope panels 36. The subsequent folding and finishing steps will be described with reference to FIGS. 2–5. A first fold along third transverse line 35, shown partially completed in FIG. 2, brings the rear envelope panel 37 into superposed position over front panel 36 thereby forming the envelope pocket. Simultaneously, the sheet can be perforated along line 11, if perforations have not been previously provided, as on the form printer. The composite forms are also "burst", or separated from the web along transverse cutting lines 15 and 15′, and the line hole strips 14 are removed prior to folding.

Figure 3:
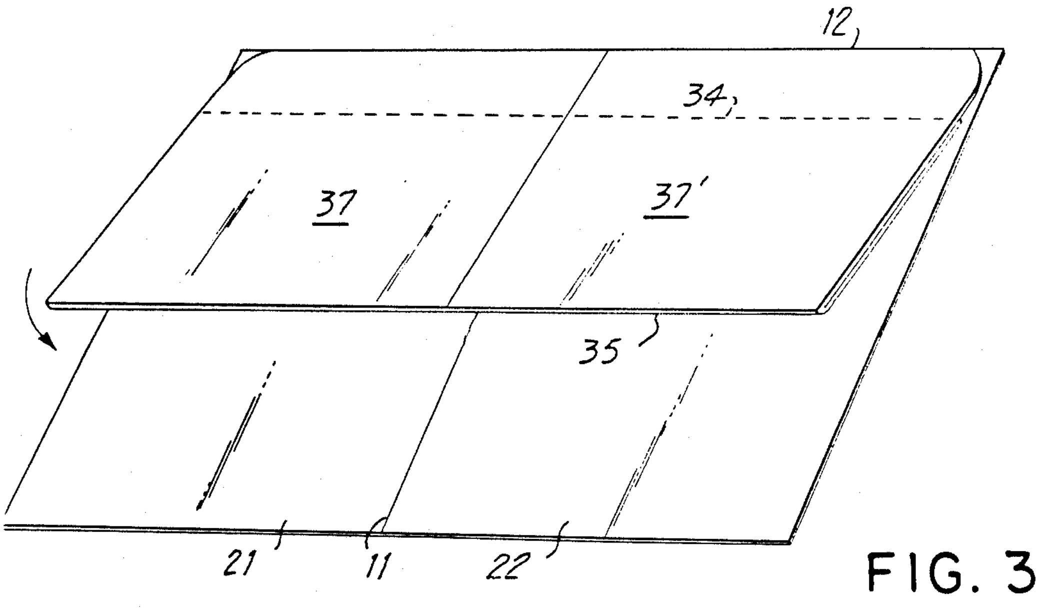
FIG. 3 is a perspective view of the embodiment of FIG. 1 showing the second folding step as partially completed.

Shown partially completed in FIG. 3 is a second fold along line 12, which brings the completed envelopes into superposed relation with the cover sheets. In one embodiment of the invention the envelopes remain detachably joined to the cover sheets along the line of perforations 12. The article is then folded along line 11 and secured to the catalog. The recipient can then remove one envelope from the assembly by tearing first along the line of perforations between the envelopes and then along the perforations at line or edge 12, much in the manner that a check is removed from a page in a conventional business checkbook. This embodiment has the advantage of leaving the other envelope detachably connected to the remaining cover sheet.

Figure 6:
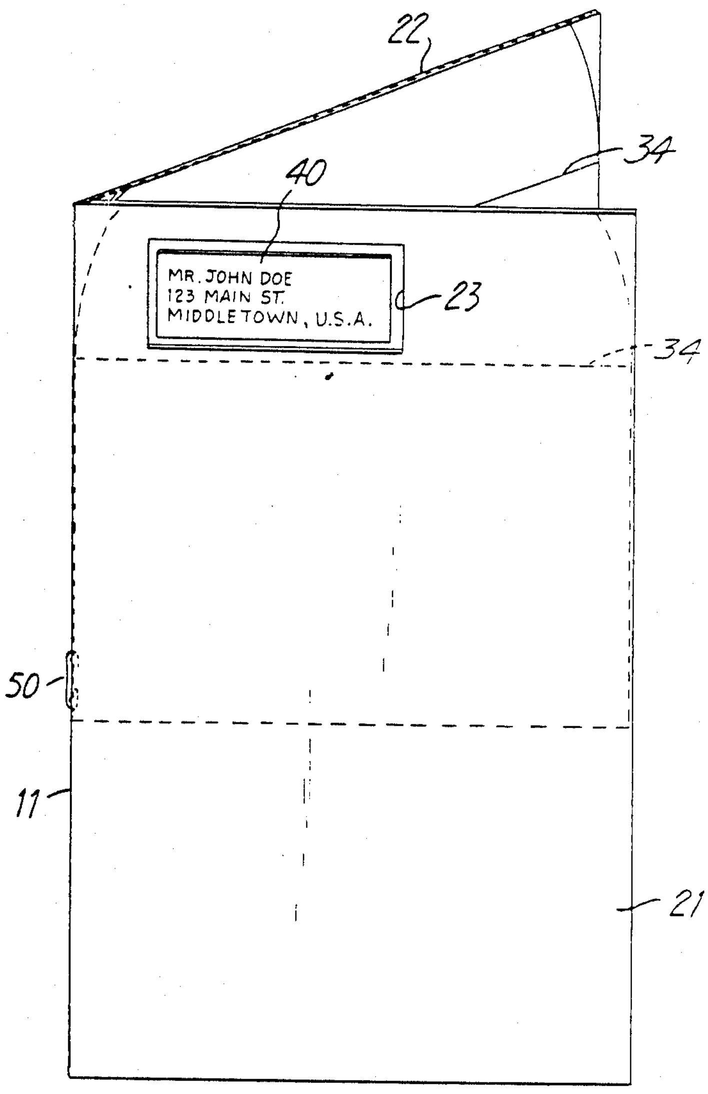
FIG. 6 is a perspective view of the completed composite cover sheet and two envelopes folded along the longitudinal fold line and ready for assembly to a magazine or catalog.
Figure 4:
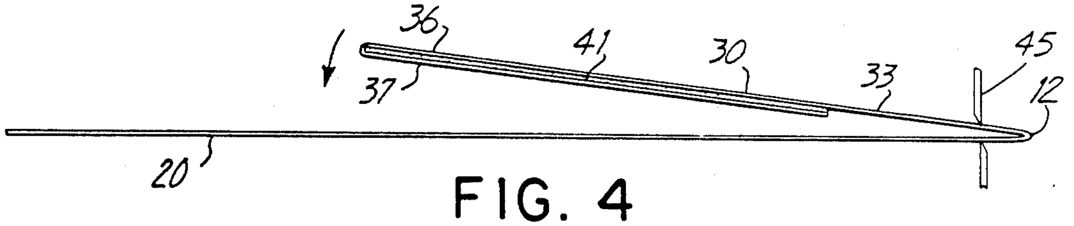
FIG. 4 is a side view illustrating schematically the trimming operation of the preferred embodiment on the article following completion of the second folding step illustrated in FIG. 3.
Figure 5:
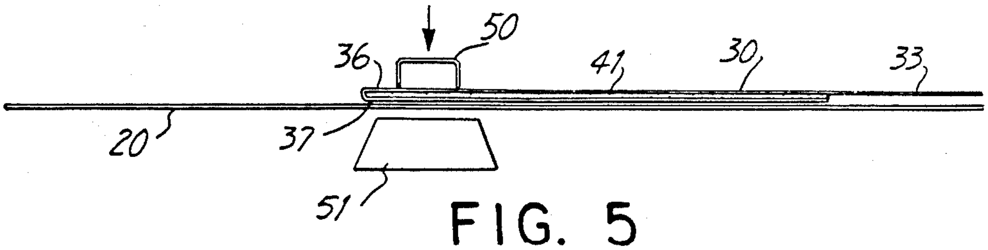
FIG. 5 is also a side view illustrating schematically the stapling, or stitching, of the envelopes along the cover sheet fold line and completion of the trimming step shown in FIG. 4.

In a second preferred embodiment of the invention illustrated by FIG. 1, the envelopes are separated from the cover sheets, as by trimming away the material adjacent fold line 12, while the envelope and cover sheets are in a superposed configuration, and essentially simultaneous with said trimming step, detachably connecting the elements as by a staple or stitching. This latter sequence of steps is schematically illustrated in FIGS. 4 and 5, where the edge trimming is accomplished for example, by scissor wheels 45, and the 3 separate elements 20 and 30 are essentially simultaneously detachably connected by staple means 50 in cooperation with anvil 51. The finished article is then ready for folding along line 11 and assembly to the catalog. See FIG. 6.

As an alternative to the stitching, or stapling, of the envelopes to the cover sheet as illustrated in FIG. 5, the envelope can be detachably secured to the cover sheet by means of a releasable, pressure sensitive adhesive. The pressure sensitive adhesive can be applied as a spot or narrow strip to either the cover sheet or the envelope panel, and preferably subsequent to the folding step shown in FIG. 2. The releasable, pressure sensitive adhesive permits the envelope to be detached without damage to itself or the cover sheet.

As will be apparent from the preceding description, an article comprising cover sheets 21 and 22 and a single large envelope can be prepared merely by eliminating the two internal lines of hot melt adhesive on panels 36 and the perforations along centerfold line 11. See, for example, FIG. 9, described in detail below. The preparation of a composite cover sheet and single envelope could be necessitated by postal regulations setting minimum envelope dimensions, especially where the catalog or magazine itself is of a small, or pocket, size. Where the article comprises but a single envelope, it will be necessary for the recipient to completely remove the cover sheets in order to separate the envelope from the assembly.

As will also be apparent, three or more return envelopes can be prepared as part of the composite sheet by providing an additional pair of hot melt glue lines and intermediate lines of perforations defining lines of separation between the respective panels and flaps. In all other respects, the steps for completing the composite article are as previously described.

As will also be apparent to one skilled in the art from the above disclosure, the relative size and configuration of the envelope, or envelopes, can be varied by changing the relative positions of transverse fold lines 34 and 35. The width can also be modified by die-cutting and bursting along the outside longitudinal edges of panels 36 and 36′ to reduce the width of one or both of the envelopes. By die-cutting and trimming one side of the envelope portion 30 to the fold line 11, one envelope can be entirely eliminated.

Figure 7:
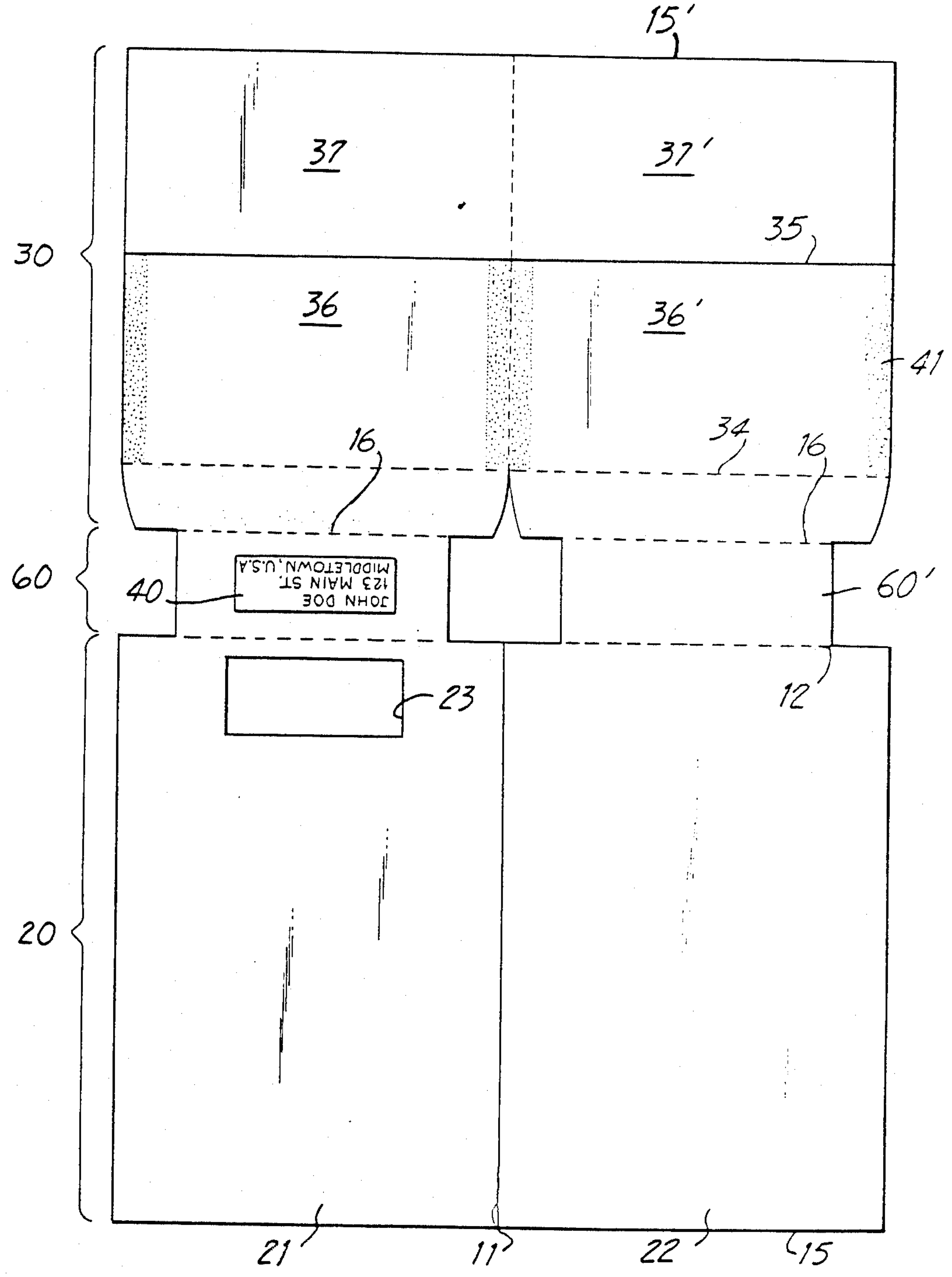
FIG. 7 is a plan view of another embodiment of the invention consisting of an integral sheet, or portion of a continuous web, comprising the composite cover sheet, two envelopes and two response devices.
Figure 8:
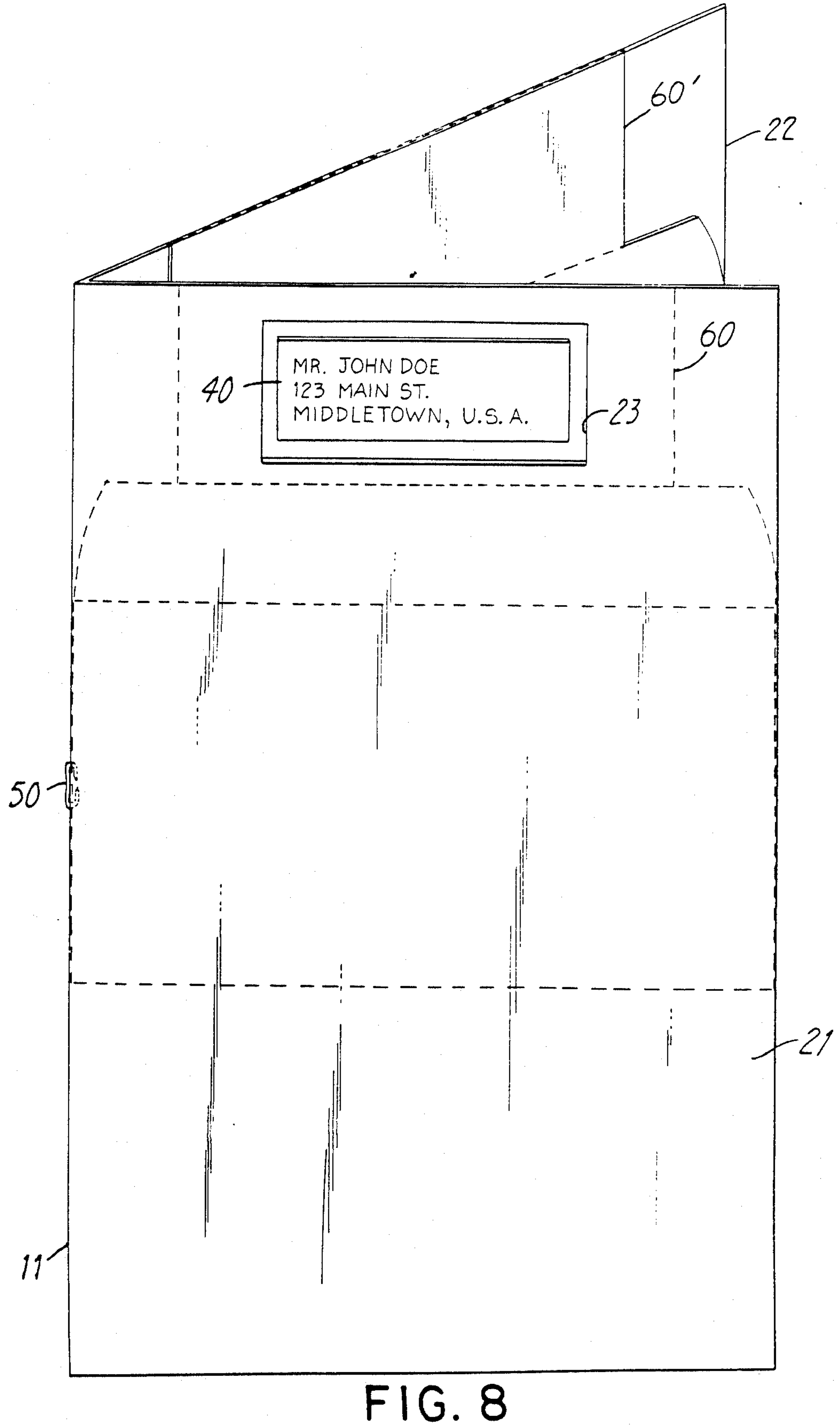
FIG. 8 is a perspective view of the completed cover sheet, envelopes and response devices shown in FIG. 7.

A further preferred embodiment of the invention incorporates a response device and is shown by way of illustration in FIG. 7. The composite sheet 10 is similar to that shown in FIG. 1, with the exception that a response device 60 and 60′, defined by first transverse line 12 and transverse parting line 16, is positioned between envelope flap 33 and cover sheet 20. In the particular embodiment shown in FIG. 7, die-cut sections 40 have been provided to reduce the width of the response devices to that of the envelope pockets formed after the first folding step. Depending on the particular use for the article, the response device could take the form of a prepaid post card that can be detached from the envelope flap along line 16, which is preferably provided with slit perforations. It will also be apparent that the methods and steps of gluing, perforating, folding and optionally, trimming and stapling, will in all respects be similar to those described in connection with FIGS. 1 through 5. The only difference will be that the response device 60 will remain interposed between the envelope portion and the cover sheet portion of the web, and that if separation is accomplished as illustrated in FIG. 4, the edge trimmed will be that between the response device and cover sheet. The finished article, suitable for assembly to a catalog, is illustrated in FIG. 8, which also has a die-cut window 23 in the cover sheet which corresponds to a personalized field of printing 40 on the response device.

Figure 9:
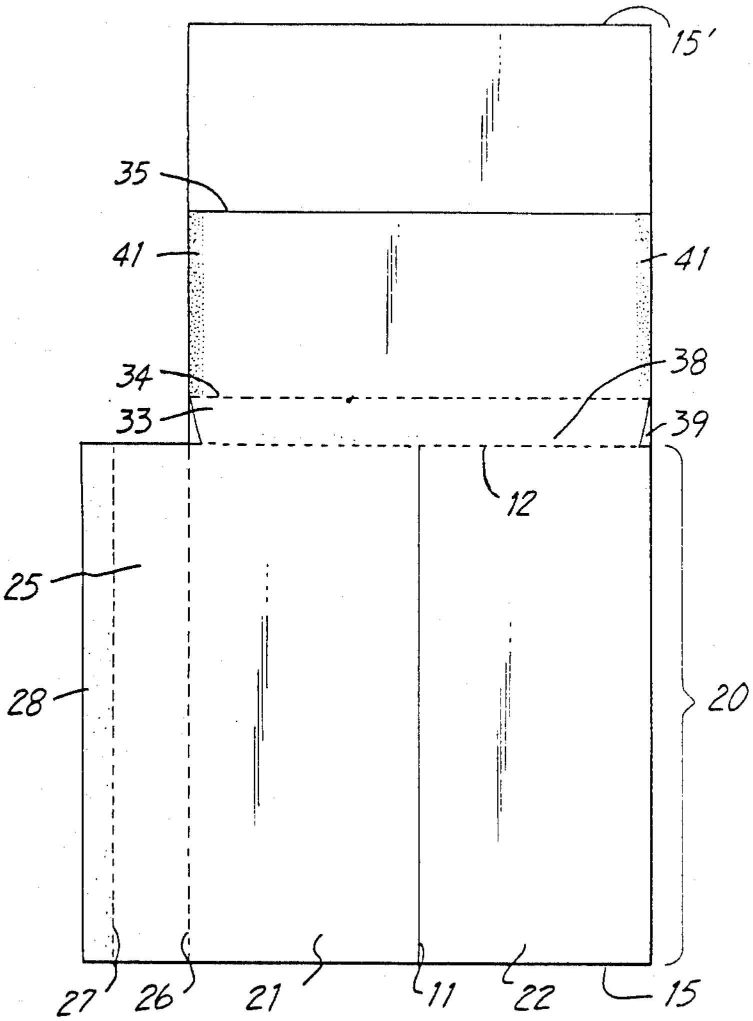
FIG. 9 is a plan view of an integral sheet, or portion of a continuous web, forming a wrapper particularly adapted to enclosing thick or bulky catalogs and including a return envelope, cover sheets and a sealing flap.
Figure 10:
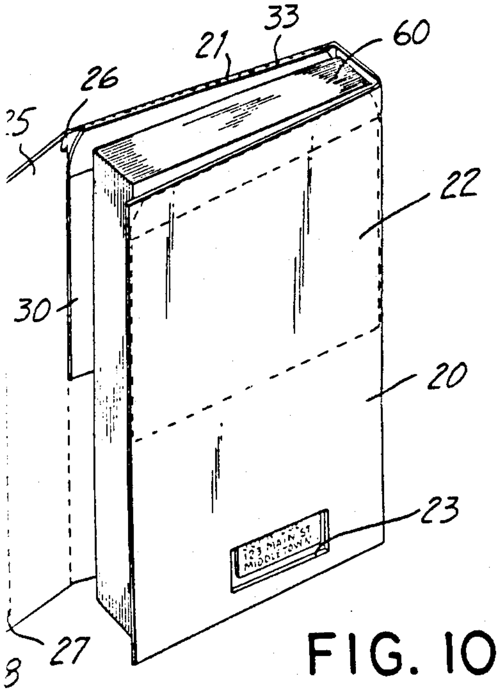
FIG. 10 is a perspective view of the wrapper of FIG. 9 enclosing a bulky catalog with the sealing flap of the wrapper still open.
Figure 11:
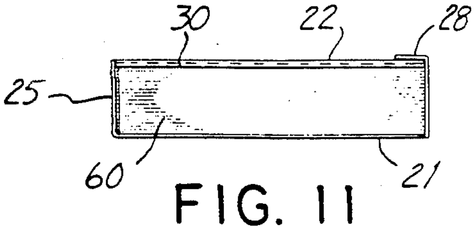
FIG. 11 is an end view of the wrapper and catalog of FIG. 10 illustrating the finished assembly of the wrapper with the sealing flap closed.

There is shown in FIG. 9 a further preferred embodiment of the invention which is particularly adapted for use with extremely thick or bulky catalogs distributed by large mail order firms. It is a specific purpose of this embodiment to provide a wrapper which completely encloses the catalog, and which can be sealed so that the integrity of the catalog is protected during mailing, and also precludes the inspection of the contents without removal of the wrapper. As illustrated in FIG. 9, the composite mailing wrapper comprises a single return envelope, cover sheets and a cover sealing flap 25, joined to the left cover sheet 21 along longitudinal joining line 26. Cover flap 25 can be provided with a strip of pressure sensitive adhesive 28, and preferably is provided with a longitudinal tear line of perforations which is positioned parallel to the outer edges of the cover flap and lies inside of the adhesive strip 28. The composite wrapper of FIG. 9 can be prepared in the manner of the embodiments of FIGS. 1 and 7, above, starting with a continuous web which is fed to the forms press where, during printing, the line holes are punched and any desired die cut configurations can also be provided. Thereafter the printed web is fed through a computer printer for personalization, and then to the folding and bursting equipment for finishing. As will be appreciated by one skilled in the art, flap 25 is prepared by die-cutting and trimming away the width of the web above the flap. Preparation of the finished article leading to the use as illustrated in FIG. 10 follows the steps described in connection with FIGS. 2 through 5. The composite mailing wrapper comprised of envelope 30 detachably connected to cover 20 is wrapped around bulky catalog 60 and sealing flap 25 is folded along joining line 26 and then along tear line 27 to bring the strip of pressure sensitive adhesive 28 into contact with the outside of rear cover 22. This configuration of the finished assembly is illustrated schematically in the end view of FIG. 11. It will be appreciated that where lines 26 and 27 are provided with perforations, opening and removal of the composite wrapper can be accomplished by pulling down to remove that portion of the cover sealing flap between the perforated lines. As will be obvious from the prior descriptions, this embodiment can be produced with more than one envelope and can include one or more response devices. The cover sealing flap 25 can also be provided on composite mailing wrappers used on catalogs or magazines of any thickness where it is deemed important to protect the integrity of the article. In lieu of the pressure sensitive adhesive 28, the cover flap can be sealed after assembly to the catalog by hot melt or other conventional adhesive means, or by wafer seals, tape, and the like. As shown in FIG. 10 a window 23 can be die-cut at a position in one or both of the cover sheets to reveal the title, publisher or other information printed on the catalog cover.

As will be apparent from the above description of the several embodiments, variations in the size, format and configuration of the elements comprising the composite mailing wrapper can readily be effected by changing the positions of the transverse fold and perforation lines, as well as the die cut areas.

The specific embodiments described are intended to be representative and illustrative of the articles and methods of the invention which can be modified without departing from the spirit and scope of the invention as determined by the following claims.

What is claimed is:

1. In the method for producing a printed composite mailing cover adapted to be joined to the binding of a magazine or catalog, said over-comprising the elements of front and rear cover sheets joined along a longitudinal fold line to which are detachably connected to least one preformed envelope, all of the elements being produced from an integral web, which integral web comprises:

a cover sheet panel defining printed front and rear cover sheets joined along longitudinal line, and integral therewith, an envelope sheet having a second transverse line defining an envelope flap and a third transverse line defining front and rear envelope panels, said envelope sheet joined to said cover sheet panel along a first transverse line, the improvement comprising the steps of (a) printing at least two elements of the integral web with personalized information;

(b) folding the integral web along the third transverse line to superpose the rear envelope panel over the front envelope panel;

(c) bonding the longitudinal edges of the front and rear envelope panels to form an envelope having an envelope pocket adjacent the envelope flap;

(d) further folding the integral web along the first transverse line in a direction perpendicular to the longitudinal fold line of the cover sheets to superpose the envelope pocket and flap over the cover sheet panel;

(e) folding the cover sheet panel and envelope along the longitudinal fold line to position the envelope pocket and envelope flap inside of the front and rear cover sheets, a portion of the reply envelope being positioned proximate the longitudinal fold line so as to contact the binding when assembled to the magazine or catalog to thereby maintain the envelope inside the cover sheets during transmittal.

2. The method of claim 1 in which the first transverse line is perforated.

3. The method of claim 1 which includes the further steps of (a) separating the superposed envelope from the cover sheet panel along the first transverse line, (b) and substantially simultaneously therewith detachably connecting the envelope to the cover sheet panel.

4. The method of claim 3 wherein separating the envelope and cover sheet panel is by skin trimming along the first transverse line.

5. The method of claim 3 wherein the envelope and cover sheet panel are separated by slitting along the first transverse line.

6. The method of claim 2 or 3 wherein the composite mailing wrapper comprises two or more reply envelopes detachably connected to the cover sheets, which method includes the further step of providing detachable connecting means along a longitudinal line between adjacent envelopes.

7. The method of claim 6 wherein the detachable connecting means are slit perforations.

8. The method of claim 3 wherein the envelope and cover sheet panel are detachably connected by stitching means.

9. The method of claim 3 wherein the envelope and cover sheet are detachably connected by adhesive means.

10. The method of claims 2 or 3 which further includes providing detachable connecting means between the front and rear cover sheets along the longitudinal fold line.

11. The method of claim 1 which further includes providing at least one window in the cover sheet panel which is in alignment with a printed field on the superposed envelope.

12. A method for producing a composite mailing cover adapted to be joined to the binding of a magazine, catalog or similar article, the cover comprising the elements of front and rear cover sheets joined along a longitudinal fold line and having detachably connected thereto at least one preformed reply envelope to which is detachably joined a response device, all of which elements are produced from an integral web, which integral web comprises:

a cover sheet panel defining front and rear cover sheets joined along a longitudinal line, and integral therewith, a response device panel joined to said cover sheet panel along a first transverse line, and an envelope sheet having a second transverse line defining an envelope flap and a third transverse line defining front and rear envelope panels, said envelope flap joned to said response device panel along a transverse parting line, the method comprising the steps of (a) printing at least two elements of the integral web with personalized addressee information;

(b) folding the integral web along the third transverse line to superpose the rear envelope panel over the front envelope panel;

(c) bonding the longitudial edges of the front and rear envelope panels to form an envelope having an envelope pocket adjacent the envelope flap;

(d) further folding the integral web along the first transverse line to superpose the envelope pocket, envelope flap and response device over the cover sheet panel; and (e) folding the cover sheet panel, envelope and response device along the longitudinal fold line to position the envelope pocket, envelope flap and response device inside of the front and rear cover sheets, a portion of the reply envelope being positioned proximete the longitudinal fold line so as to contact the binding when assembled to the magazine or catalog to thereby maintain the envelope inside the cover sheets during transmittal.

13. The method of claim 12 wherein the first transverse line is perforated.

14. The method of claim 13 wherein the transverse parting line is perforated.

15. The method of claim 13 wherein the width of the response device is less than the width of the envelope pocket.

16. The method of claim 13 which includes the further steps of:

(a) separating the superposed response device from the cover sheet panel along the first transverse line, and (b) substantially simultaneously therewith detachably connecting the response device and envelope to the cover sheet panel.

17. The method of claim 16 wherein separating the response device and cover sheet panel is by skin trimming along the first transverse line.

18. The method of claim 16 wherein separating the response device and cover sheet panel is by slitting along the first line.

19. The method of claim 16 wherein the response device and envelope are detachably connected to the cover sheet panel by stitching means.

20. The method of claim 16 wherein the response device and envelope are detachably connected to the cover sheet panel by adhesive means.

* * * * *

UNITED STATES PATENT AND TRADEMARK OFFICE

CERTIFICATE OF CORRECTION

PATENT NO. : 4,726,802

DATED : February 23, 1988

INVENTOR(S) : Kurt E. Volk, Jr.

It is certified that error appears in the above-identified patent and that said Letters Patent is hereby corrected as shown below:

Col. 2, line 45, rewrite "data base" as --database--.

Col. 5, line 15, after "pocket" delete ",".

Col. 6, lines 18 and 57, rewrite "die cut" as --die-cut--.

Claim 1, col. 6, line 66, rewrite "over" as --cover--.

Col. 6, line 68, delete "to" (last occurrence) and insert --at--.

Col. 7, line 5 after "along" insert --a--.

Col. 7, line 14, after "personalized" insert --addresses--.

Claim 12, col. 8, line 38, rewrite "proximete" as --proximate--.

Signed and Sealed this

Twentieth Day of September, 1988

*Attest:*

DONALD J. QUIGG

*Attesting Officer*

*Commissioner of Patents and Trademarks*